US012591502B1

(12) United States Patent
Sathiyanesan

(10) Patent No.: US 12,591,502 B1
(45) Date of Patent: Mar. 31, 2026

(54) MULTI-USER REMOTE FIRMWARE DEVELOPMENT AND DEBUGGING SYSTEM

(71) Applicant: AMERICAN MEGATRENDS INTERNATIONAL, LLC, Duluth, GA (US)

(72) Inventor: Muthukumar Sathiyanesan, Westford, MA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 358 days.

(21) Appl. No.: 18/331,285

(22) Filed: Jun. 8, 2023

(51) Int. Cl.
  *G06F 11/36*  (2025.01)
  *G06F 11/362*  (2025.01)

(52) U.S. Cl.
  CPC .................................. *G06F 11/362* (2013.01)

(58) Field of Classification Search
  USPC .......................................................... 717/134
  See application file for complete search history.

(56) References Cited

U.S. PATENT DOCUMENTS

| | | | | |
|---|---|---|---|---|
| 7,512,934 B2 * | 3/2009 | Gatlin | .................. | G06F 11/321 |
| | | | | 717/124 |
| 10,049,290 B2 | 8/2018 | Vu | | |
| 10,866,922 B1 | 12/2020 | Hoffmann | | |
| 11,016,833 B2 | 5/2021 | Jeyasingh | | |
| 2008/0282109 A1 * | 11/2008 | Okamiya | ............ | G06F 11/3652 |
| | | | | 714/28 |

* cited by examiner

*Primary Examiner* — Hanh Thi-Minh Bui
(74) *Attorney, Agent, or Firm* — Newport IP, LLC; Matthew M. Gaffney

(57) ABSTRACT

A multi-user remote firmware development and debugging system includes multiple computing systems under test ("SUTs") that include a serial data communication interface and a serial peripheral interface ("SPI") flash emulator. The system also includes a host computer coupled to the SPI flash emulators and the serial data communication interfaces. The host can receive firmware debugging messages from an SUT and transmit the firmware debugging messages to a remote computing device operated by a developer. The host can also update the firmware of an SUT in response to a command from the remote computing device. Additionally, the host can power SUTs on or off using a network power switch and provide the ability to view video generated by the SUTs on the remote computing device and to remotely control the SUTs from the remote computing device using a network keyboard/video/mouse switch or a host-controlled automated testing adapter in an SUT.

20 Claims, 7 Drawing Sheets

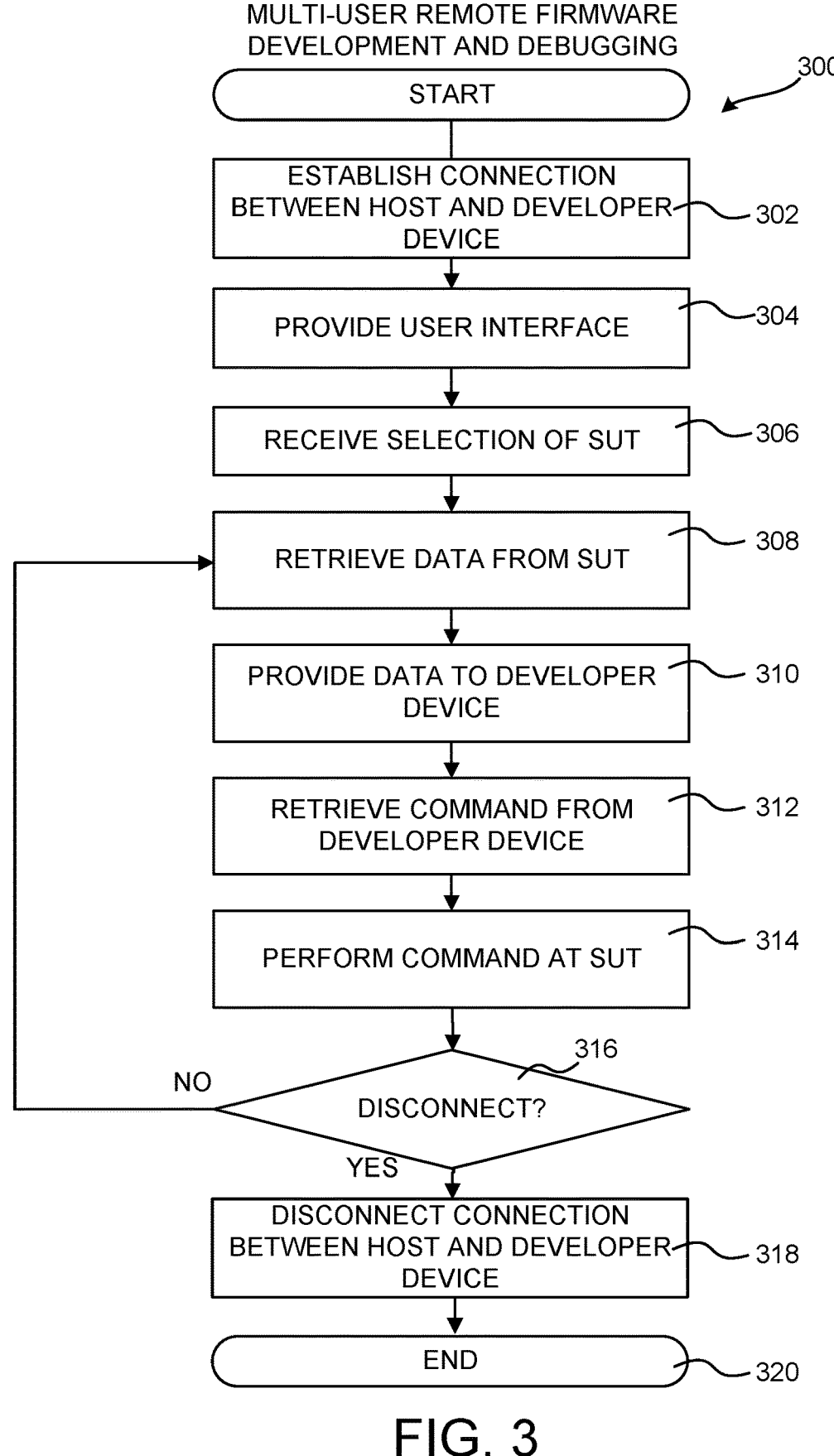

MULTI-USER REMOTE FIRMWARE
DEVELOPMENT AND DEBUGGING

300

START

ESTABLISH CONNECTION
BETWEEN HOST AND DEVELOPER
DEVICE — 302

PROVIDE USER INTERFACE — 304

RECEIVE SELECTION OF SUT — 306

RETRIEVE DATA FROM SUT — 308

PROVIDE DATA TO DEVELOPER
DEVICE — 310

RETRIEVE COMMAND FROM
DEVELOPER DEVICE — 312

PERFORM COMMAND AT SUT — 314

316
NO        DISCONNECT?

YES

DISCONNECT CONNECTION
BETWEEN HOST AND DEVELOPER
DEVICE — 318

END — 320

FIG. 3

MULTI-USER REMOTE FIRMWARE DEVELOPMENT AND DEBUGGING SYSTEM

BACKGROUND

In many computing systems low-level instruction code, commonly referred to as "firmware," is used as an intermediary between the hardware components of the computing system and high-level software executing on the computing system, such as an operating system. The firmware provides a set of software routines that allow high-level software to interact with the hardware components of the computing system using standard calls.

During firmware development it is typically necessary for developers to be physically co-located with the computing systems utilized to test and debug the firmware. For example, it may be necessary for firmware developers to be at the same site as the computing system utilized to test and debug a firmware in order to directly view the status and configuration of the hardware of the computing system.

It is, however, not always possible or convenient for firmware developers to be co-located with the computing systems used to debug a firmware. A firmware development team might, for example, include developers located at various locations around the world. As another example, it might not be possible for firmware developers to physically access computing devices utilized to debug a firmware during a pandemic or other type of emergency.

Another challenge commonly encountered during the development and debugging of firmware stems from the fact that each computing system upon which a firmware is tested (referred to herein as a system under test ("SUT")) typically requires its own host computer. Maintaining a host computer for each SUT, however, is expensive, takes up a large amount of laboratory space, and utilizes a large amount of power.

It is with respect to these and other considerations that the disclosure made herein is presented.

SUMMARY

A multi-user remote firmware development and debugging system is disclosed herein. Through implementations of the disclosed technologies, developers on a firmware development team can develop and debug firmware even when they are remotely located from the SUTs utilized to test the firmware that is currently under development. Additionally, multiple SUTs can be accessed through a single host computer, thereby saving money, space, and power. Technical benefits other than those specifically mentioned herein can also be realized through an implementation of the disclosed technologies.

In order to achieve the technical benefits described above, and potentially others, a multi-user remote firmware development and debugging system is provided. The multi-user remote firmware development and debugging system includes multiple SUTs. The SUTs include a serial data communication interface, such as an RS-232C interface, and a serial peripheral interface ("SPI") flash emulator, in one embodiment. The SPI flash emulator stores a firmware that is under development.

The multi-user remote firmware development and debugging system also includes a multi-user firmware development and debugging host (which will be referred to herein as a "host") that is communicatively coupled to the SPI flash emulator and the serial data communication interface of the SUTs. The host is configured to establish a communications session with a remote computing device, such as a computing device operated by a firmware developer, by way of a network connection. Once a communications session has been established, the host can receive firmware debugging messages from an SUT by way of the serial data communication interface and transmit the firmware debugging messages to the remote computing device by way of the network connection. In this manner, a remotely located developer can view firmware debugging messages generated by a remotely located SUT.

The host can also receive a command from the remote computing device to update the firmware of an SUT. In response thereto, the SPI flash emulator in the SUT can receive and update the firmware that it stores. In this manner, a remotely located developer can update the firmware utilized by a remotely located SUT in order to perform testing and debugging operations on the firmware while it executes on the SUT.

In an embodiment, the host is also connected to digital video cameras that are communicatively coupled to the host. A digital video camera may be provided for each of the SUTs connected to the host. The digital video cameras can be pointed toward each respective SUT (e.g., pointed at the system board or other internal components of an SUT), thereby providing digital video of a corresponding SUT to the host. In this embodiment, the host provides the digital video to the remote computing device by way of the network connection. In this manner, a remotely located developer can view the physical configuration of each SUT.

In an embodiment, the multi-user remote firmware development and debugging system also includes a network power switch communicatively coupled to the host. In this embodiment, the host can receive a power command from the remote computing device by way of the network connection. In response thereto, the host can transmit a message to the network power switch to cause the network power switch to power one of the SUTs on or off. In this way, a remotely located developer can power cycle the SUTs for testing and debugging purposes.

In an embodiment, the host can retrieve power status data identifying the power status of the one of SUTs from the network power switch. For instance, the power status data may indicate whether an SUT is currently powered on or off. The host can provide the power status data to a remote computing device. In this way, a remotely located developer can view the current power status of the SUTs.

In an embodiment, the multi-user remote firmware development and debugging system includes a network keyboard/video/mouse ("KVM") switch communicatively coupled to the host. The network KVM switch is also coupled to the video outputs and keyboard/mouse inputs of the SUTs. In this embodiment, the host can receive video output generated by the SUTs from the network KVM switch and to provide the video output to the remote computing device by way of the network connection. In this manner, a remotely located developer can view the video output from each of the SUTs.

The host can also receive keyboard and/or mouse input from the remote computing device and provide the keyboard and/or mouse input to the network KVM switch. The network KVM switch, in turn, provides the keyboard and/or mouse input to one of the SUTs. In this manner, a remotely located developer can provide keyboard and/or mouse input to an SUT in the same manner they would if they were physically present at the SUT.

In an embodiment, the SUTs include host-controlled automated testing ("HCAT") adapters. The HCAT adapters can generate video output and provide the video output to the host for transmission to a remote computing device. The HCAT adapters can also receive keyboard and/or mouse input from the host and utilize the keyboard and/or mouse input as if it were made locally to an SUT. In this manner, a remotely located developer can provide keyboard and/or mouse input to an SUT in the same manner they would if they were physically present at the SUT and video the video generated by the SUT without the use of a network KVM switch.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a flow diagram showing a routine illustrating aspects of the operation of the multi-user remote firmware development and debugging system shown in FIGS. 1A-2B, according to one or more embodiments presented herein;

DETAILED DESCRIPTION

Figure 1A:
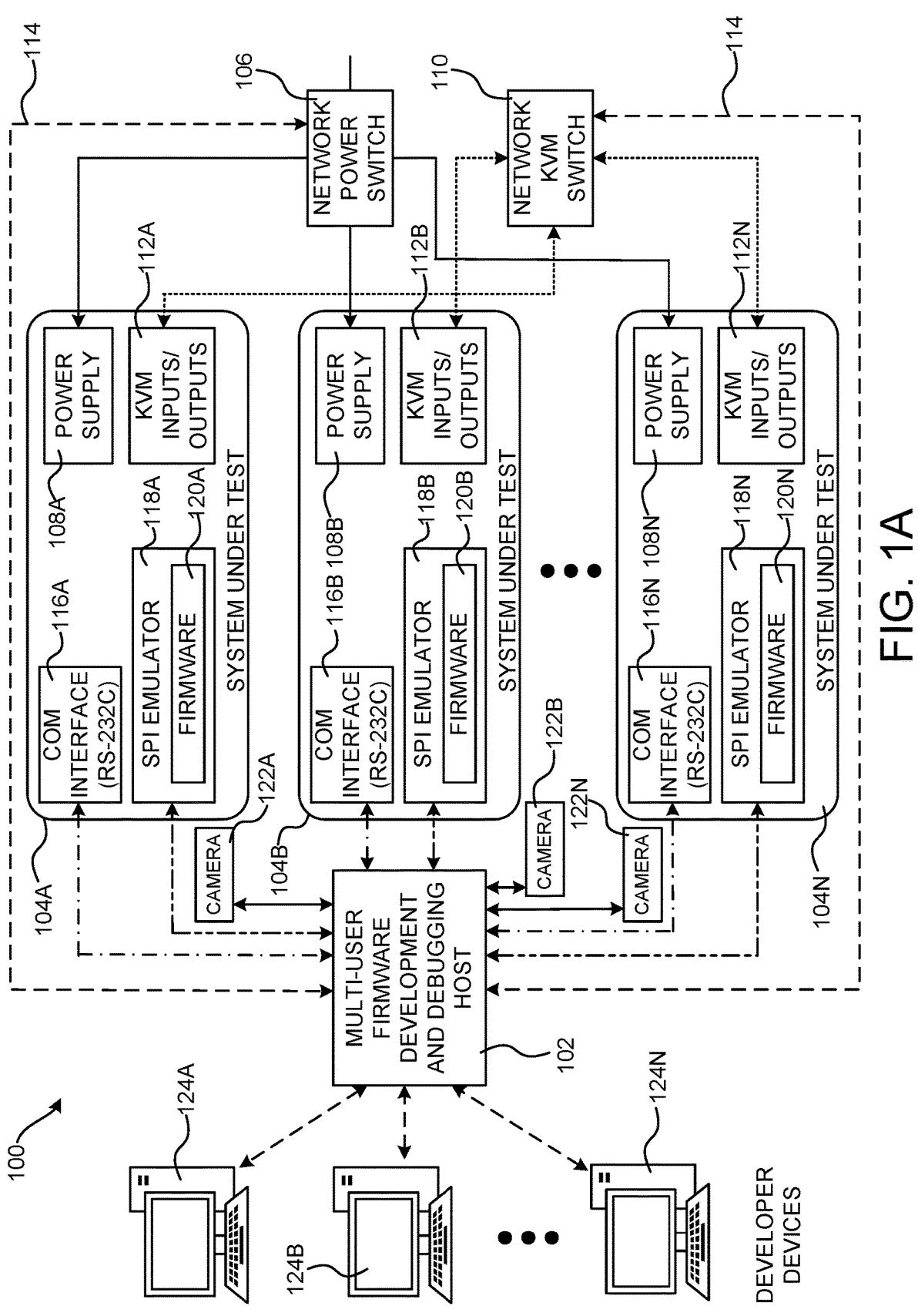
FIG. 1A is a system architecture diagram illustrating aspects of the configuration and operation of a multi-user remote firmware development and debugging system, according to one or more embodiments presented herein.

The following detailed description is directed to a multi-user remote firmware development and debugging system. Through implementations of the disclosed technologies, developers on a firmware development team can develop and debug firmware even when they are remotely located from the SUTs utilized to test the firmware that is currently under development. Additionally, multiple SUTs can be accessed through a single host computer, thereby saving money, space, and power. Technical benefits other than those specifically mentioned herein can also be realized through an implementation of the disclosed technologies. Additional details regarding these aspects will be provided below with regard to FIGS. 1A-5.

Before discussing the disclosed technologies in detail, it is to be appreciated that aspects of the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, hand-held computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

As discussed briefly above, many types of computing systems utilize firmware that acts as an intermediary between the hardware components of the computing system and high-level software executing on the computing system, such as an operating system. The firmware provides a set of software routines that allow high-level software to interact with the hardware components of the computing system using standard calls.

During firmware development it is typically necessary for developers to be physically co-located with the computing systems utilized to test and debug the firmware (i.e., the SUTs). For example, it may be necessary for firmware developers to be at the same site as an SUT that is utilized to test and debug a firmware in order to directly view the status and configuration of the hardware of the SUT.

It is, however, not always possible or convenient for firmware developers to be co-located with the SUTs used to debug a firmware. A firmware development team might, for example, include developers located at various locations around the world. As another example, it might not be possible for firmware developers to physically access SUTs that are utilized to debug a firmware during a pandemic or other type of emergency.

Another challenge commonly encountered during the development and debugging of firmware stems from the fact that each SUT typically requires its own host computer. Maintaining a host computer for each SUT, however, is expensive, takes up a large amount of laboratory space, and utilizes a large amount of power. It is with respect to these and other considerations that the disclosure made herein is presented.

In order to address the technical considerations set forth above, and potentially others, a multi-user remote firmware development and debugging system 100 (which may be referred to herein as the "system 100") is disclosed herein. FIG. 1A is a system architecture diagram illustrating aspects of the configuration and operation of the system 100, according to one or more embodiments presented herein.

The system 100 includes multiple SUTs 104A-104N (which might be referred to herein individually as "a SUT 104" or collectively as "the SUTs 104"). The SUTs 104 are computing devices, such as desktop or rackmount personal computers. In an embodiment, the SUTs 104 include a serial data communication interface 116A-116N (which might be referred to herein individually as "a serial data communication interface 116" or collectively as "the serial data communication interfaces 116"), respectively, such as an RS-232C interface.

The SUTs 104 are also equipped with a serial peripheral interface ("SPI") flash emulator 118A-118N (which might be referred to herein individually as "a SPI flash emulator 118" or collectively as "the SPI flash emulators 118"), respectively, in one embodiment. Each SPI flash emulator 118 stores a firmware 120A-120N, respectively, that is under development. In one embodiment, the SPI flash emulator 118 is an EM100PRO-G2 SPI NOR FLASH EMULATOR from DEDIPROG. Other SPI flash emulators from other manufacturers are utilized in other embodiments.

The system 100 also includes a multi-user firmware development and debugging host 102 (which will be referred to herein as the "host 102"). The host 102 is a computing device that is communicatively coupled to the SPI flash emulators 118 and the serial data communication interfaces 116 of the SUTs 104. For example, RS-232C cables can be utilized to connect the host 102 to the serial data communication interfaces 116 of each SUT 104 and universal serial bus ("USB") cables can be utilized to connect the host 102 to the SPI emulators 118 of each SUT 104. Other types of interfaces and interconnects can be utilized in other embodiments.

The host 102 also configured to establish communications sessions with remote computing devices 124A-124N (which might be referred to herein individually as "a developer device 124" or collectively as "the developer devices 124"), such as computing devices operated by remotely located firmware developers, by way of a network connection.

Once a communications session has been established between a developer device 124 and the host 102, the host 102 can receive firmware debugging messages from an SUT 104 by way of the serial data communication interface 116 and transmit the firmware debugging messages to the developer device 124 by way of the network connection. In this manner, a remotely located developer can view firmware debugging messages generated by a remotely located SUT 104.

The host 102 can also receive a command from a developer device 124 to update the firmware 120 of an SUT 104.

In response thereto, the host 102 can transmit a new firmware 120 to the SUT 104 and instruct the SPI flash emulator 118 to update the firmware 120. In response thereto, the SPI flash emulator 118 in the SUT 104 can receive and update the firmware 120 that it stores. In this manner, a remotely located developer can update the firmware 120 utilized by a remotely located SUT 104 in order to perform testing and debugging operations on the firmware 120 while it executes on the SUT 104.

In an embodiment, the host 102 is also connected to digital video cameras 122A-122N (which might be referred to herein individually as "a digital video camera 122" or collectively as "the digital video cameras 122") that are communicatively coupled to the host 102. For example, a USB interface is utilized in one embodiment to connect the digital video cameras 122 to the host 102.

A digital video camera 122 may be provided for each of the SUTs 104 connected to the host 102. The digital video cameras 102 can be pointed toward each respective SUT 104 (e.g., pointed at the system board or other internal components of an SUT 104), thereby providing digital video of hardware components of a corresponding SUT 104 to the host 102. In this embodiment, the host 102 provides the digital video to a developer device 124 by way of the network connection. In this manner, a remotely located developer can view the physical configuration of each SUT 104 via a live digital video stream.

In an embodiment, the system 100 also includes a network power switch 106 communicatively coupled to the host 102. For example a network connection 114 can be established between the host 102 and the network power switch 106. Additionally, power is routed to the SUTs 104 through the network power switch 106. In this manner, the network power switch 106 is able to control the power state of each of the SUTs 104 (e.g., power on or off).

In this embodiment, the host 102 can receive a power command from a developer device 124 by way of the network connection. In response thereto, the host 102 can transmit a message to the network power switch 106 to cause the network power switch 106 to power one of the SUTs 104 on or off. In this way, a remotely located developer can power cycle the SUTs 104 for testing and debugging purposes.

In an embodiment, the host 102 can retrieve power status data identifying the power status of the one of SUTs 104 from the network power switch 106. For instance, the power status data may indicate whether an SUT 104 is currently powered on or off. The host 102 can provide the power status data to a developer device 124. In this way, a remotely located developer can view the current power status of each of the SUTs 104.

In an embodiment, the system 100 includes a network keyboard/video/mouse ("KVM") switch 110 communicatively coupled to the host 102 by way of the network connection 114. The network KVM switch 110 is also coupled to the video outputs and keyboard/mouse inputs 112A-112N, respectively, of the SUTs 104. In this embodiment, the host 102 can receive video output generated by the SUTs 104 from the network KVM switch 110 and provide the video output to a developer device 124 by way of a network connection. In this manner, a remotely located developer can view the video output generated by each of the SUTs 104 on their developer device 124.

The host 102 can also receive keyboard and/or mouse input from a developer device 124 and provide the keyboard and/or mouse input to the network KVM switch 110 via the network connection 114. The network KVM switch 110, in turn, provides the keyboard and/or mouse input to one of the SUTs 104. In this manner, a remotely located developer can provide keyboard and/or mouse input to an SUT 104 in the same manner they would if they were physically present at the SUT 104.

Figure 1B:
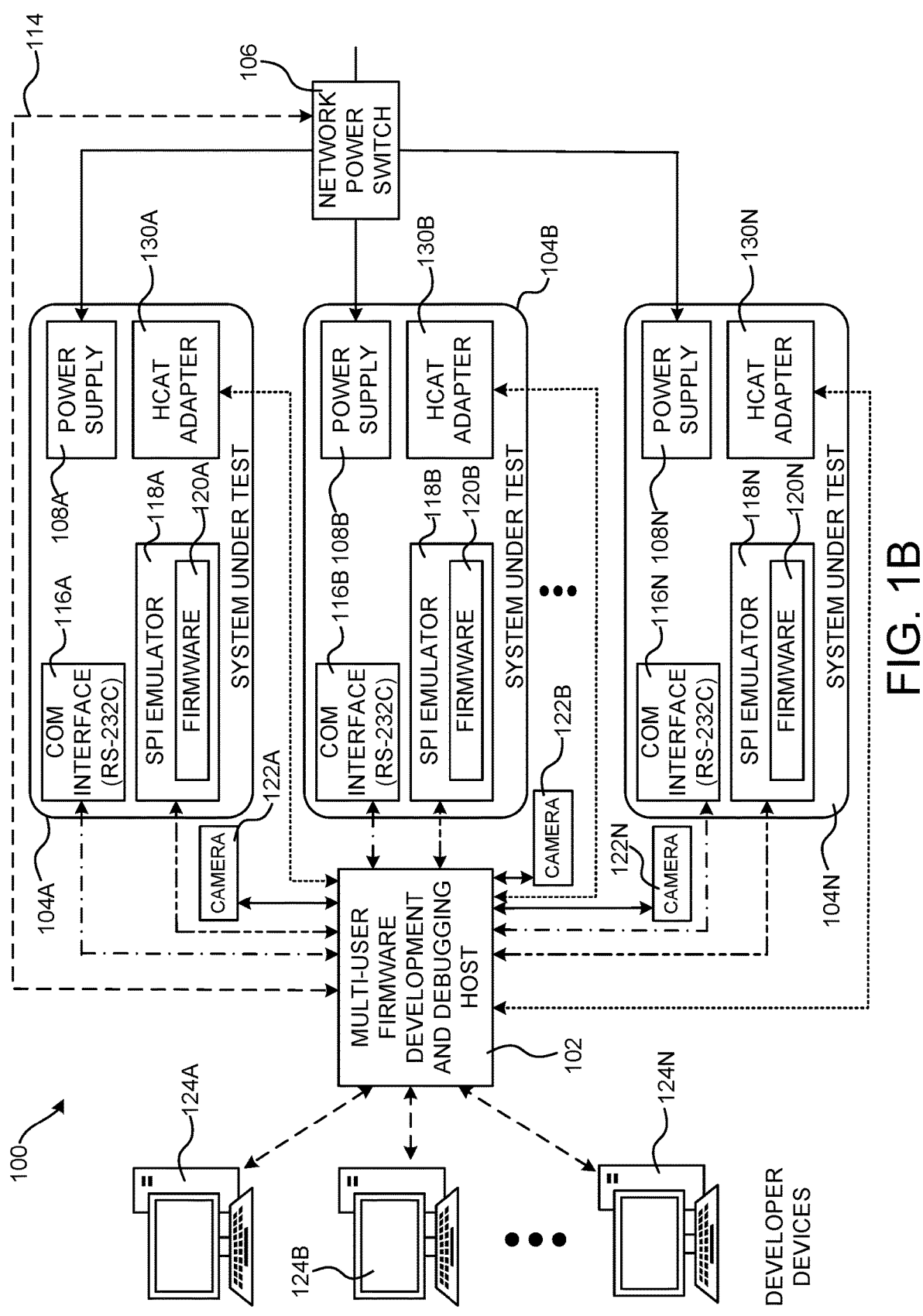
FIG. 1B is a system architecture diagram illustrating further aspects of the configuration and operation of the multi-user remote firmware development and debugging system shown in FIG. 1A, according to one or more embodiments presented herein.

In another embodiment, which is illustrated in FIG. 1B, the SUTs 104 include host-controlled automated testing ("HCAT") adapters 130A-130N, respectively. The HCAT adapters 130 can generate video output and provide the video output to the host 102 for transmission to a developer device 124. The HCAT adapters 130 can also receive keyboard and/or mouse input from the host 102 and utilize the keyboard and/or mouse input as if it were made locally to an SUT 104. In one embodiment, the HCAT adapters 130 are HCAT adapters from AMERICAN MEGATRENDS INTERNATIONAL. Other devices from other manufacturers can be utilized in other embodiments.

In an embodiment, the host 102 provides a user interface ("UI") to the developer devices 124 through which a user can access the functionality described above. For example, and without limitation, the UI can include UI elements for providing the firmware debugging messages, the digital video, the power status, and video output from SUTs. The UI can also include UI controls to initiate the functionality described above for establishing a connection to a SUT 104, flashing the firmware 120 of an SUT 104, powering an SUT 104 on or off, and for performing other types of functionality for debugging a firmware 120 of a SUT 104 remotely. The UI can be provided by way of a web browser, a standalone application, or another type of software component, and can include other elements in other embodiments.

Figure 2A:
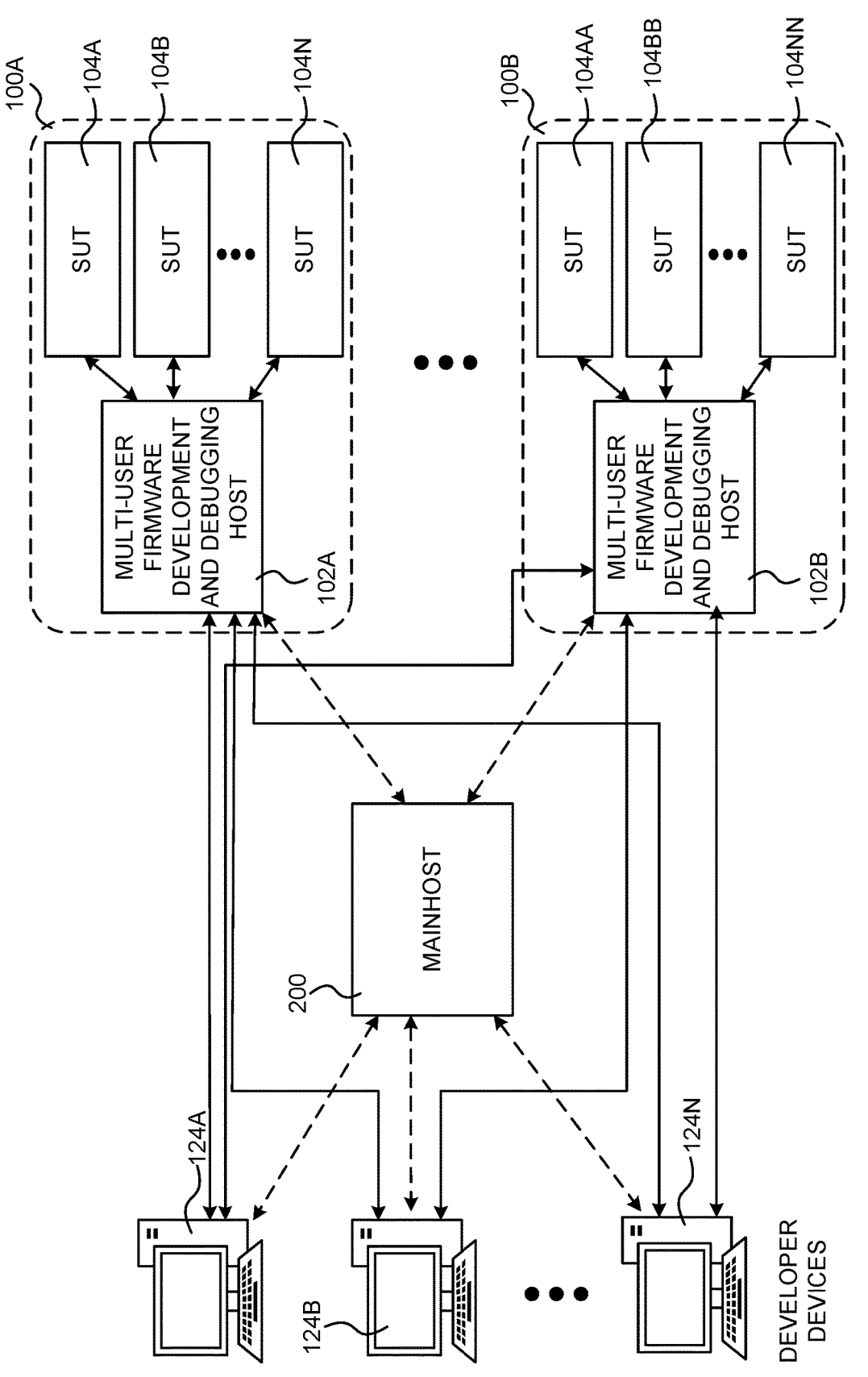
FIG. 2A is a system architecture diagram showing a configuration of the multi-user remote firmware development and debugging system shown in FIGS. 1A and 1B that utilizes a mainhost, according to one or more embodiments presented herein.

FIG. 2A is a system architecture diagram showing a configuration of the system 100 shown in FIGS. 1A and 1B that utilizes a mainhost 200, according to one or more embodiments presented herein. The mainhost 200 is a computing system configured to all the developer devices 124 to utilize the functionality described above with a larger number of SUTs 104.

In order to provide this functionality, multiple hosts 102A and 102B can be utilized. Each of the hosts 102A and 102B is coupled to SUTs 104 in the manner described above. For instance, in the example shown in FIG. 2A, the host 102A is coupled to a group 100A of SUTs 104 that includes the SUTs 104A-104N and the host 102B is coupled to a group 100B of SUTs 104 that includes the SUTs 104AA-104NN. In operation, a user of a developer device 124 can establish a connection to the mainhost 200, which provides a UI for selection of a host 102 and/or a SUT 100 connected to the selected host 102. Thereafter, the mainhost 200 can facilitate provision of the functionality provided above through the utilization of the selected host 102.

Figure 2B:
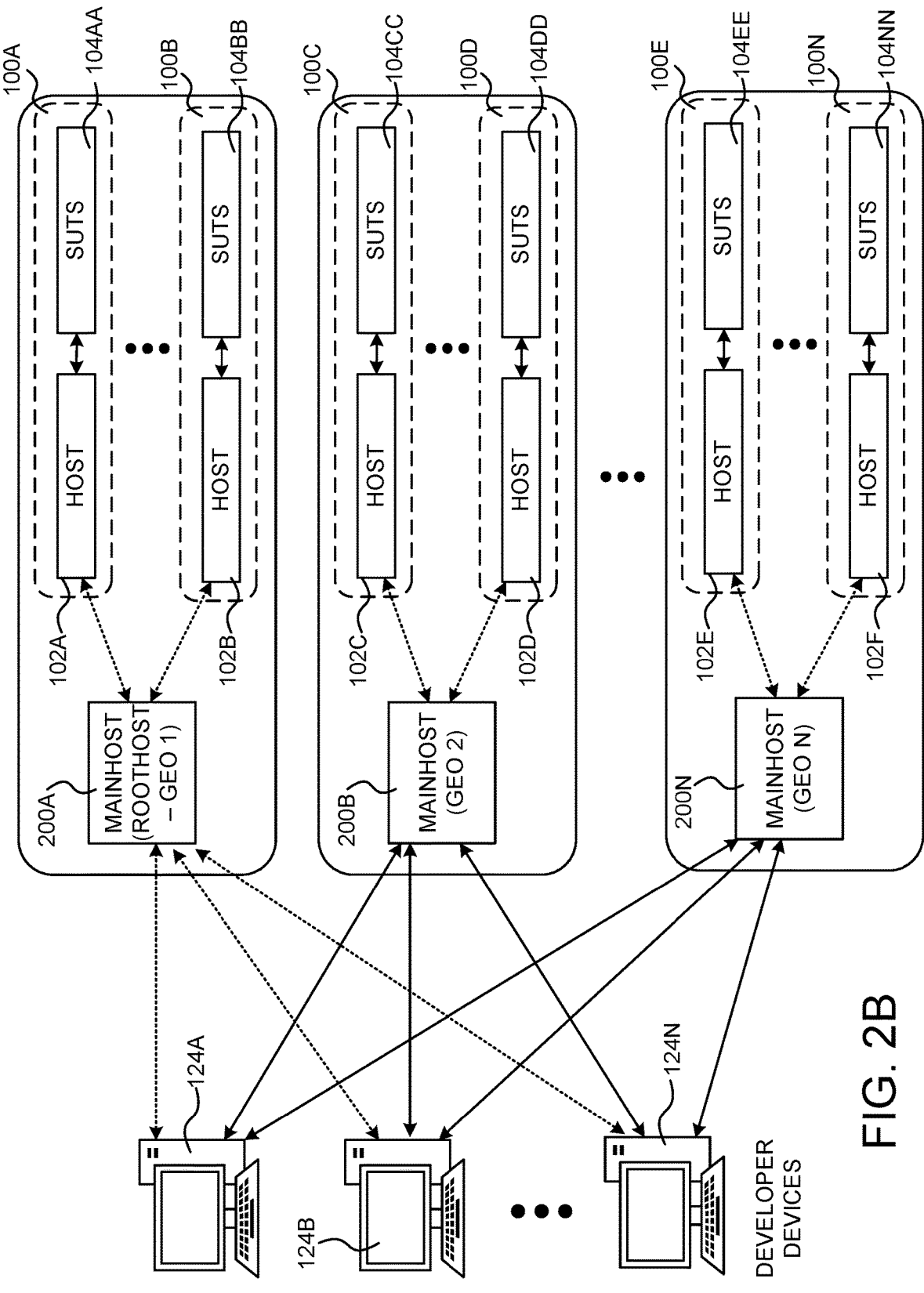
FIG. 2B is a system architecture diagram showing a configuration of the multi-user remote firmware development and debugging system shown in FIGS. 1A and 1B that utilizes multiple mainhosts, according to one or more embodiments presented herein.

FIG. 2B is a system architecture diagram showing a configuration of the system 100 shown in FIGS. 1A and 1B that utilizes multiple mainhosts 200A-200N, according to one or more embodiments presented herein. In this example, each mainhost 200 is connected to multiple hosts 102 in the manner described above with regard to FIG. 2A. For instance, in the illustrated configuration, the mainhost 200A is connected to the hosts 102A and 102B in groups 100A and 100B which, in turn, are connected to the SUTs 104AA and 104BB, respectively. Similarly, the mainhost 200B is connected to the hosts 102C and 102D in groups 100C and 100D, respectively, which, in turn, are connected to the SUTs 104CC and 104DD. The mainhost 200C is connected to the hosts 102E and 102F in the group 100E which, in turn, are connected to the SUTs 104EE and 104NN.

In operation, a user of a developer device 124 can establish a connection to one of the mainhosts 200A-200N, which provides a UI for selection of a host 102 connected to the selected mainhost 200 and/or a SUT 100 connected to the selected host 102. Thereafter, the selected mainhost 200 can facilitate provision of the functionality provided above through the utilization of the selected host 102.

FIG. 3 is a flow diagram showing a routine 300 illustrating aspects of the operation of the system 100 100 shown in FIGS. 1A-2B, according to one or more embodiments presented herein. It is to be appreciated that the logical operations described herein with respect to FIG. 3, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 300 begins at operation 302, where a connection is established between a host 102 and a developer device 124. Once a connection is established, the routine 300 proceeds to operation 304, where the host 102 provides a UI for selecting an SUT 104 to the developer device 124. The routine 300 then proceeds to operation 306, where a user of the developer device 124 can select a desired SUT 104 in the UI.

In response to receiving a selection of an SUT 104 at operation 306, the routine 300 proceeds to operation 308, where the host 102 retrieves the data described above from the selected SUT 104. The routine 300 then proceeds from operation 308 to operation 310, where this data is provided from the host 102 to the developer device 124 for presentation in the UI in the manner described above. For example, and without limitation, the UI can provide the firmware debugging messages, the digital video, the power status, video output from the selected SUT 104, and other types of data.

From operation 310, the routine 300 proceeds to operation 312, where the host 102 receives a command from the developer device 124 by way of the UI described above. For example, and without limitation, the host 102 can receive commands from the developer device 124 for flashing the firmware 120 of the SUT 104, powering the SUT 104 on or off, and for performing other types of functionality for debugging a firmware 120 of a SUT 104 remotely. The host 102 provides the command and causes the SUT 104 to perform the command at operation 314.

From operation 314, the routine 300 proceeds to operation 316, where a determination is made as to whether a user has requested to disconnect from the host 102 and/or the SUT 104. If a request to disconnect has not been received, the routine 300 proceeds from operation 316 to operation 308, where the operations described above can be repeated. If a request to disconnect has been received, the routine 300 proceeds from operation 316, where the connection between the host 102 and the developer device 124 is disconnected. The routine 300 then proceeds from operation 318 to operation 320, where it ends.

Figure 4:
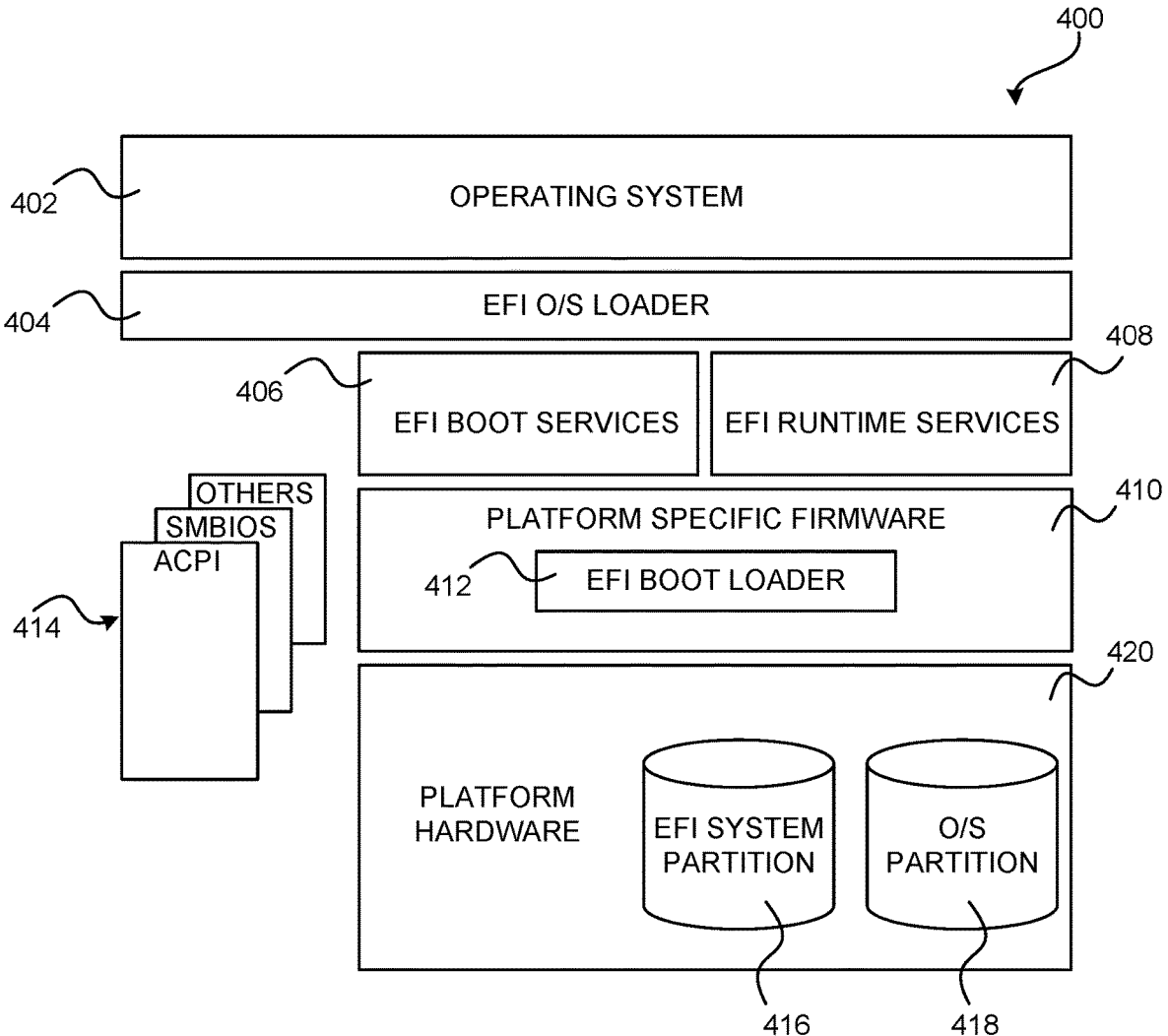
FIG. 4 is a software architecture diagram illustrating a software architecture for a unified extensible firmware interface ("UEFI")-compliant firmware that provides an operating environment for aspects of the technologies presented herein in one embodiment.

Turning now to FIG. 4, a software architecture diagram will be described that illustrates an architecture for a Unified Extensible Firmware Interface ("UEFI") Specification-compliant firmware 400 that can be configured to provide and/or utilize aspects of the technologies disclosed herein. In particular, the firmware architecture shown in FIG. 4 can be utilized to implement the firmware 120 utilized by the SUTs 104. The firmware architecture shown in FIG. 4 can also be utilized by the developer devices 124 and the host 102. The firmware 120 can be implemented using technologies other than UEFI in other configurations.

The UEFI Specification describes an interface between an operating system 402 and a UEFI Specification-compliant firmware 400. The UEFI Specification also defines an interface that a firmware 400 can implement, and an interface that an operating system 402 can use while booting. How a firmware implements the interface can be left up to the manufacturer of the firmware. The UEFI Specification also defines a way for an operating system 402 and a firmware 400 to exchange information necessary to support the operating system boot process. The term "UEFI Specification" used herein refers to both the EFI Specification developed by INTEL CORPORATION and the UEFI Specification managed by the UEFI FORUM.

As shown in FIG. 4, the architecture can include platform hardware 420, such as that described below with regard to FIG. 4, platform specific firmware 410, and an operating system 402. A boot loader 412 for the operating system 402 can be retrieved from the UEFI system partition 416 using a UEFI operating system loader 404. The UEFI system partition 416 can be an architecturally shareable system partition. As such, the UEFI system partition 416 can define a partition and file system designed to support safe sharing of mass storage between multiple vendors. An OS partition 418 can also be utilized.

Once started, the UEFI OS loader 404 can continue to boot the complete operating system 402. In doing so, the UEFI OS loader 404 can use UEFI boot services 406, an interface to other supported specifications, to survey, comprehend, and initialize the various platform components and the operating system software that manages them. Thus, interfaces 414 from other specifications can also be present on the system. For example, the advanced configuration and power interface ("ACPI") and the System Management BIOS ("SMBIOS") specifications can be supported.

UEFI boot services 406 can provide interfaces for devices and system functionality used during boot time. UEFI runtime services 408 can also be available to the UEFI OS loader 404 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework") Unlike the UEFI Specification, which focuses on programmatic interfaces for the interactions between the operating system 402 and system firmware 400, the Framework is a group of specifications that together describe a firmware implementation that has been designed to perform the full range of operations that are required to initialize a platform from power on through transfer of control to the operating system 402. The specifications that make up the Framework, which are also available from INTEL CORPORATION, are also expressly incorporated herein by reference.

Figure 5:
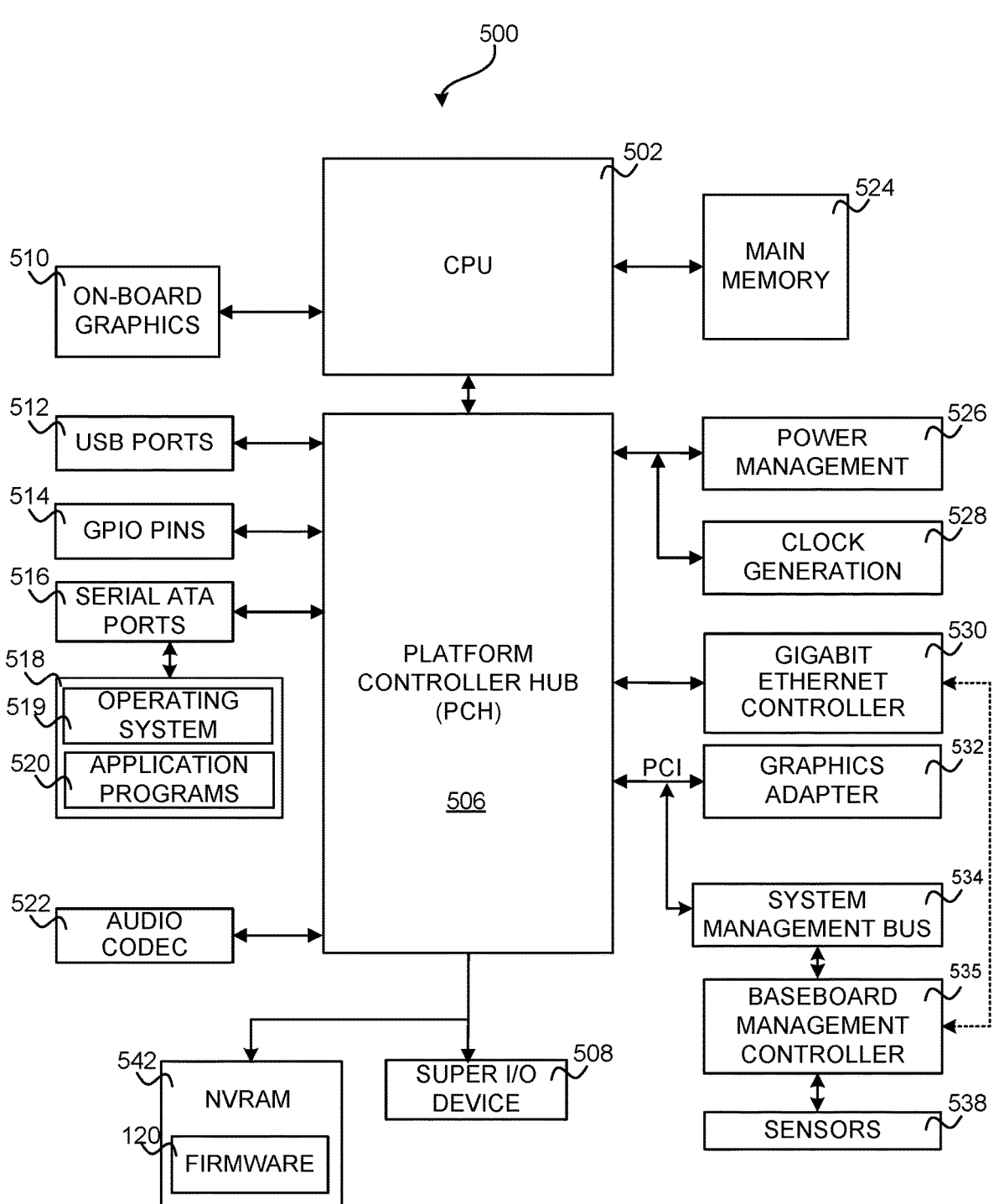
FIG. 5 is a computer architecture diagram that shows an illustrative architecture for a computer that can implement the technologies disclosed herein, according to an embodiment.

Referring now to FIG. 5, a computer architecture diagram that shows an illustrative architecture for a computer that can provide an operating environment for the technologies presented herein will be described. For example, and without limitation, the computer architecture shown in FIG. 5 can be utilized to implement the developer devices 124, the host 102, the SUTs 104, and/or any of the other computing systems described herein.

FIG. 5 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including hand-held devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 5 shows an illustrative computer architecture for a computer 500 that can be utilized to implement aspects of the technologies described herein. The computer 500 includes a baseboard, or "motherboard", which is a printed circuit board to which a multitude of components or devices can be connected by way of a system bus or other electrical communication path. In one illustrative configuration, a central processing unit ("CPU") 502 operates in conjunction with a Platform Controller Hub ("PCH") 506.

The CPU 502 is a central processor that performs arithmetic and logical operations necessary for the operation of the computer 500. The computer 500 can include a multitude of CPUs 502. Each CPU 502 might include multiple processing cores.

The CPU 502 provides an interface to a random access memory ("RAM") used as the main memory 524 in the computer 500 and, possibly, to an on-board graphics adapter 510. The PCH 506 provides an interface between the CPU 502 and the remainder of the computer 500.

The PCH 506 can also be responsible for controlling many of the input/output functions of the computer 500. In particular, the PCH 506 can provide one or more universal serial bus ("USB") ports 512, an audio codec 522, a Gigabit Ethernet Controller 532, and one or more general purpose input/output ("GPIO") pins 514. The USB ports 512 can include USB 2.0 ports, USB 3.0 ports and USB 3.1 ports among other types of USB ports. The audio codec 522 can include Intel High Definition Audio, Audio Codec '97 ("AC'97") and Dolby TrueHD among others.

The PCH 506 can also include functionality for providing networking functionality through a Gigabit Ethernet Controller 530. The Gigabit Ethernet Controller 530 is capable of connecting the computer 500 to another computer via a network. Connections which can be made by the Gigabit Ethernet Controller 530 can include local area network ("LAN") or wide area network ("WAN") connections. LAN and WAN networking environments are commonplace in offices, enterprise-wide computer networks, intranets, and the Internet.

The PCH 506 can also provide a bus for interfacing peripheral card devices such as a graphics adapter 532. In one configuration, the bus comprises a Peripheral Component Interconnect ("PCI") bus. The PCI bus can be a Peripheral Component Interconnect extended ("PCI-X") bus or a Peripheral Component Interconnect Express ("PCIe") bus among others, according to embodiments. Other types of buses are utilized in other embodiments.

The PCH 506 can also provide a system management bus 534 for use in managing the various components of the computer 500. Additional details regarding the operation of the system management bus 534 and its connected components are provided below. Power management circuitry 526 and clock generation circuitry 528 can also be utilized during the operation of the PCH 506.

The PCH 506 is also configured to provide one or more interfaces for connecting mass storage devices to the computer 500. For instance, according to one configuration, the PCH 506 includes a serial advanced technology attachment ("SATA") adapter for providing one or more SATA ports 516. The SATA ports 516 can be connected to one or more mass storage devices, such as a SATA disk drive 518, storing an OS 519 and application programs 520. As known to those skilled in the art, an OS 519 comprises a set of programs that control operations of a computer and allocation of resources. An application program 520 is software that runs on top of the OS 519, or other runtime environment, and uses computing resources to perform application specific tasks desired by the user.

According to one configuration, the OS 519 comprises the LINUX operating system. According to another configuration, the OS 519 comprises the WINDOWS operating system from MICROSOFT CORPORATION. According to another configuration, the OS 519 comprises the UNIX operating system or one of its variants. It should be appreciated that other operating systems can also be utilized.

The mass storage devices connected to the PCH 506, and their associated computer-readable storage media, provide non-volatile storage for the computer 500. Although the description of computer-readable storage media contained herein refers to a mass storage device, such as a hard disk or CD-ROM drive, it should be appreciated by those skilled in the art that computer-readable storage media can be any available media that can be accessed by the computer 500.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals.

Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 500.

A low pin count ("LPC") interface can also be provided by the PCH 506 for connecting a Super I/O device 508. The Super I/O device 508 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 542 for storing firmware 120 that includes program code containing the basic routines that help to start up the computer 500 and to transfer information between elements within the computer 500 as discussed above with regard to FIG. 4.

It should be appreciated that the program modules disclosed herein, including the firmware 120, can include software instructions that, when loaded into the CPU 502 and executed, transform a general-purpose computer 500 into a special-purpose computer 500 customized to facilitate all, or part of, the operations disclosed herein. As detailed throughout this description, the program modules can provide various tools or techniques by which the computer 500 can participate within the overall systems or operating environments using the components, logic flows, and/or data structures discussed herein.

The CPU 502 can be constructed from any number of transistors or other circuit elements, which can individually or collectively assume any number of states. More specifically, the CPU 502 can operate as a state machine or finite-state machine. Such a machine can be transformed to a second machine, or a specific machine, by loading executable instructions contained within the program modules. These computer-executable instructions can transform the CPU 502 by specifying how the CPU 502 transitions between states, thereby transforming the transistors or other circuit elements constituting the CPU 502 from a first machine to a second machine, wherein the second machine can be specifically configured to perform the operations disclosed herein.

The states of either machine can also be transformed by receiving input from one or more user input devices, network interfaces (such as the Gigabit Ethernet Controller 530), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include but are not limited to the technology used to implement the storage media, whether the storage media are characterized as primary or secondary storage, and the like. For example, if the storage media are implemented as semiconductor-based memory, the program modules can transform the physical state of the semiconductor main memory 524 and/or NVRAM 542. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 506 can include a system management bus 534. A baseboard management controller ("BMC") 535 can be connected to the system management bust 534. A BMC 535 is a microcontroller that monitors aspects of the operation of the computer 500. In a more specific configuration, the BMC 535 monitors inventory and health-related aspects associated with the computer 500, such as, but not limited to, the temperature of one or more components of the computer 500, speed of rotational components (e.g., spindle motor, CPU fan, etc.) within the computer 500, the voltage across or applied to one or more components within the computer 500, and the available and/or used capacity of memory devices within the computer 500. To accomplish these monitoring functions, the BMC 535 is communicatively connected to one or more components by way of the system management bus 534 in some configurations.

In one configuration, these components include sensor devices 538 for measuring various operating and performance-related parameters within the computer 500. The sensor devices 538 can be either hardware or software based components configured or programmed to measure or detect one or more of the various operating and performance-related parameters.

The BMC 535 functions as the master on the system management bus 534 in most circumstances but can also function as either a master or a slave in other circumstances. Each of the various components communicatively connected to the BMC 535 by way of the system management bus 534 is addressed using a slave address. The system management bus 534 is used by the BMC 535 to request and/or receive various operating and performance-related parameters from one or more components, such as the firmware 120, which are also communicatively connected to the system management bus 534.

It should be appreciated that the functionality provided by the computer 500 can be provided by other types of computing devices, including hand-held computers, smart-phones, gaming systems, set top boxes, tablet computers, embedded computer systems, personal digital assistants, and other types of computing devices known to those skilled in the art. It is also contemplated that the computer 500 might not include all the components shown in FIG. 5, can include other components that are not explicitly shown in FIG. 5 or might utilize an architecture completely different than that shown in FIG. 5.

Based on the foregoing, it should be appreciated that a multi-user remote firmware development and debugging system 100 has been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms. The subject matter described above is provided by way of illustration only and should not be construed as limiting.

Various modifications and changes can be made to the subject matter described herein without following the example configurations and applications illustrated and described, and without departing from the true spirit and scope of the present invention.

What is claimed is:

1. A multi-user remote firmware development and debugging system, comprising:
   a plurality of computing systems under test ("SUTs"), each of the plurality of SUTs comprising a serial data communication interface and a serial peripheral interface ("SPI") flash emulator storing a firmware; and
   a multi-user firmware development and debugging host communicatively coupled to the SPI flash emulator and the serial data communication interface of each of the plurality of SUTs, the multi-user firmware development and debugging host configured to
      establish a communications session with a remote computing device communicatively coupled to the multi-user firmware development and debugging host by way of a network connection,
      receive, from the serial data communication interface of the one of the plurality of SUTs, firmware debugging messages that the one of the plurality of SUTs generates at least in part during a pre-operating-system phase of the one of the plurality of SUTs, transmit the firmware debugging messages to the remote computing device by way of the network connection,
      receive a command from the remote computing device to update the firmware of the one of the plurality of SUTs, and
      responsive to receiving the command, cause the SPI flash emulator of the one of the plurality of SUTs to update the firmware, wherein the multi-user firmware development and debugging host, by being communicatively coupled to both the serial data communication interface and the SPI flash emulator of each SUT and performing the foregoing acts, provides:
         remote visibility via the serial data communication interface during the pre-operating-system phase of the one of the plurality of the SUTs, and
         a one-to-multiple topology of the multi-user firmware development and debugging host to the SUTs.

2. The multi-user remote firmware development and debugging system of claim 1, further comprising a digital video camera communicatively coupled to the multi-user firmware development and debugging host for each of the plurality of SUTs, wherein each digital video camera is configured to provide digital video of a corresponding SUT to the multi-user firmware development and debugging host, and wherein the multi-user firmware development and debugging host is configured to provide the digital video to the remote computing device by way of the network connection.

3. The multi-user remote firmware development and debugging system of claim 1, further comprising a network power switch communicatively coupled to the multi-user firmware development and debugging host, and wherein the multi-user firmware development and debugging host is further configured to receive a power command from the remote computing device by way of the network connection and, in response thereto, to cause the network power switch to power one of the plurality of SUTs on or off.

4. The multi-user remote firmware development and debugging system of claim 3, wherein the multi-user firmware development and debugging host is further configured retrieve data identifying a power status of the one of the plurality of SUTs from the network power switch and to provide the data identifying the power status of the one of the plurality of SUTs to the remote computing device.

5. The multi-user remote firmware development and debugging system of claim 1, further comprising a network keyboard/video/mouse ("KVM") switch communicatively coupled to the multi-user firmware development and debugging host, and wherein the multi-user firmware development and debugging host is further configured to receive video output generated by the one of the plurality of SUTs from the network KVM switch, and to provide the video output to the remote computing device by way of the network connection.

6. The multi-user remote firmware development and debugging system of claim 5, wherein the multi-user firmware development and debugging host is further configured to receive keyboard input from the remote computing device and to provide the keyboard input to the network KVM switch, whereby the network KVM switch provides the keyboard input to the one of the plurality of SUTs.

7. The multi-user remote firmware development and debugging system of claim 1, wherein each of the plurality of SUTs further comprises a host-controlled automated testing ("HCAT") adapter configured to generate video output, to provide the video output to the multi-user firmware development and debugging host and to receive keyboard and mouse input from the multi-user firmware development and debugging host.

8. The multi-user remote firmware development and debugging system of claim 1, wherein the multi-user remote firmware development and debugging system provides increased resource-utilization efficiency relative to a system with one host per SUT.

9. A multi-user remote firmware development and debugging system, comprising:
    a first plurality of computing systems under test ("SUTs"), the first plurality of SUTs comprising first serial data communication interfaces and first serial peripheral interface ("SPI") flash emulators;
    a first multi-user firmware development and debugging host communicatively coupled to the first SPI flash emulators and the first serial data communication interfaces of the first plurality of SUTs;
    a second plurality of SUTs, the second plurality of SUTs comprising second serial data communication interfaces and second SPI flash emulators;
    a second multi-user firmware development and debugging host communicatively coupled to the second SPI flash emulators and the second serial data communication interfaces of the second plurality of SUTs; and
    a host computer communicatively coupled to the first multi-user firmware development and debugging host and the second multi-user firmware development and debugging host, the host computer configured to
        establish a communications session with a remote computing device communicatively coupled to the host computer by way of a network connection,
        establish a communications session with the first multi-user firmware development and debugging host,
        receive firmware debugging messages from the first multi-user firmware development and debugging host, the firmware debugging messages generated by one of the first plurality of SUTs at least in part during a pre-operating-system phase of the one of the first plurality of SUTs,
        transmit the firmware debugging messages to the remote computing device by way of the network connection,
        receive a command from the remote computing device to update the firmware of the one of the first plurality of SUTs,
        responsive to receiving the command, transmit a request to the first multi-user firmware development and debugging host to update the firmware of the one of the plurality of SUTs, and
        responsive to the request, causing the first SPI flash emulators to update the firmware, wherein the multi-user firmware development and debugging host, by being communicatively coupled to both the first serial data communication interface and the first SPI flash emulators of the one of the first plurality of the SUTs and performing the foregoing acts, provides:
            remote visibility via the first serial data communication interface during the pre-operating-system phase of the one of the first plurality of the SUTs.

10. The multi-user remote firmware development and debugging system of claim 9, wherein the host computer is further configured to:
    establish a communications session with the second multi-user firmware development and debugging host;
    receive second firmware debugging messages from the second multi-user firmware development and debugging host, wherein the second firmware debugging messages are generated by one of the second plurality of SUTs;
    transmit the second firmware debugging messages to the remote computing device by way of the network connection;
    receive a second command from the remote computing device to update the firmware of the one of the second plurality of SUTs; and
    responsive to receiving the second command, transmit a second request to the second multi-user firmware development and debugging host to update the firmware of the one of the second plurality of SUTs.

11. The multi-user remote firmware development and debugging system of claim 9, further comprising:
    first digital video cameras communicatively coupled to the first multi-user firmware development and debugging host for each of the first plurality of SUTs, each of the first digital video cameras configured to provide first digital video of a corresponding one of the first plurality of SUTs to the first multi-user firmware development and debugging host; and
    second digital video cameras communicatively coupled to the second multi-user firmware development and debugging host for each of the second plurality of SUTs, each of the second digital video cameras configured to provide second digital video of a corresponding one of the second plurality of SUTs to the second multi-user firmware development and debugging host, and wherein
        the first multi-user firmware development and debugging host is configured to provide the first digital video to the host computer,
        the second multi-user firmware development and debugging host is configured to provide the second digital video to the host computer, and the host computer is configured to provide the first digital video and the second digital video to the remote computing device.

12. The multi-user remote firmware development and debugging system of claim 9, further comprising:

a first network power switch communicatively coupled to the first multi-user firmware development and debugging host; and a second network power switch communicatively coupled to the second multi-user firmware development and debugging host, and wherein the host computer is further configured to receive a first power command from the remote computing device and, in response to receiving the first power command, to transmit the first power command to the first multi-user firmware development and debugging host to cause the first network power switch to power one of the first plurality of SUTs on or off, and receive a second power command from the remote computing device and, in response to receiving the second power command, to transmit the second power command to the second multi-user firmware development and debugging host to cause the second network power switch to power one of the second plurality of SUTs on or off.

13. The multi-user remote firmware development and debugging system of claim 12, wherein the host computer is further configured to:

retrieve first data identifying a power status of the one of the first plurality of SUTs from the first multi-user firmware development and debugging host and to provide the first data identifying the power status of the one of the plurality of first SUTs to the remote computing device; and retrieve second data identifying a power status of the one of the second plurality of SUTs from the second multi-user firmware development and debugging host and to provide the second data identifying the power status of the one of the plurality of second SUTs to the remote computing device.

14. The multi-user remote firmware development and debugging system of claim 9, further comprising:

a first network keyboard/video/mouse ("KVM") switch communicatively coupled to the first multi-user firmware development and debugging host; and a second network KVM switch communicatively coupled to the second multi-user firmware development and debugging host, and wherein the host computer is further configured to receive first video output generated by one of the first plurality of SUTs from the first multi-user firmware development and debugging host and to provide the first video output to the remote computing device, and receive second video output generated by one of the second plurality of SUTs from the second multi-user firmware development and debugging host and to provide the second video output to the remote computing device.

15. The multi-user remote firmware development and debugging system of claim 14, wherein the host computer is further configured to:

receive first keyboard input from the remote computing device;

provide the first keyboard input to the first multi-user firmware development and debugging host, whereby the first multi-user firmware development and debugging host provides the first keyboard input to the first network KVM switch and the first network KVM switch provides the first keyboard input to the one of the first plurality of SUTs;

receive second keyboard input from the remote computing device;

provide the second keyboard input to the second multi-user firmware development and debugging host, whereby the second multi-user firmware development and debugging host provides the second keyboard input to the second network KVM switch and the second network KVM switch provides the second keyboard input to the one of the second plurality of SUTs.

16. The multi-user remote firmware development and debugging system of claim 9, wherein:

each of the plurality of first SUTs further comprises a host-controlled automated testing ("HCAT") adapter configured to generate first video output; and each of the plurality of second SUTs further comprises a HCAT adapter configured to generate second video output, and wherein the host computer is further configured to receive, from the first multi-user firmware development and debugging host, the first video output from an HCAT adapter of the one of the first plurality of SUTs, provide the first video output to the remote computer, receive, from the second multi-user firmware development and debugging host, the second video output from an HCAT adapter of the one of the second plurality of SUTs, and provide the second video output to the remote computer.

17. A multi-user remote firmware development and debugging system, comprising:

a first host computer communicatively coupled to a first multi-user firmware development and debugging host and a second multi-user firmware development and debugging host, the first multi-user firmware development and debugging host communicatively coupled to first serial data communication interfaces and first serial peripheral interface ("SPI") flash emulators of a first plurality of computing systems under test ("SUTs") and the second multi-user firmware development and debugging host communicatively coupled to second serial data communication interfaces and second SPI flash emulators of a second plurality of SUTs; and a second host computer communicatively coupled to a third multi-user firmware development and debugging host and a fourth multi-user firmware development and debugging host; the third multi-user firmware development and debugging host communicatively coupled to third serial data communication interfaces and third SPI flash emulators of a third plurality of SUTs and the fourth multi-user firmware development and debugging host communicatively coupled to fourth serial data communication interfaces and fourth serial SPI flash emulators of a fourth plurality of SUTs, wherein the first host computer is configured to receive first firmware debugging messages generated by one of the first or second plurality of SUTs from the first multi-user firmware development and debugging host and to provide the first firmware debugging messages to a first remote computing device communicatively coupled to the first host computer, the generation occurring at least in part during a pre-operating-system phase of the one of the first or second plurality of SUTs, and the second host computer is configured to receive second firmware debugging messages generated by one of the third or fourth plurality of SUTs from the second multi-user firmware development and debugging host and to provide the second firmware debugging messages to a second remote computing device communicatively coupled to the second host computer, the generation occurring at least in part during a pre-operating-system phase of the one of the third or fourth plurality of SUTs, wherein:

the first host computer is configured to receive a first command from the first remote computing device to update a first firmware stored by the first or second SPI flash emulator of one of the first or second plurality of SUTs;

in response thereto, to cause the first or second SPI flash emulator to update the first firmware;

the second host computer is configured to receive a second command from the second remote computing device to update a second firmware stored by the third or fourth SPI flash emulator of one of the third or fourth plurality of SUTs;

in response thereto, to cause the third or fourth SPI flash emulator to update the second firmware; and the multi-user firmware development and debugging system, by being communicatively coupled to the serial data communication interfaces of the one of the first or second or third or fourth plurality of SUTs and performing the foregoing acts, provides: remote visibility via the serial data communication interfaces during the pre-operating-system phase of the one of the first or second or third or fourth plurality of SUTs.

18. The multi-user remote firmware development and debugging system of claim 17, further comprising:

first digital video cameras communicatively coupled to the first multi-user firmware development and debugging host for each of the first plurality of SUTs;

second digital video cameras communicatively coupled to the second multi-user firmware development and debugging host for each of the second plurality of SUTs;

third digital video cameras communicatively coupled to the third multi-user firmware development and debugging host for each of the third plurality of SUTs; and fourth digital video cameras communicatively coupled to the fourth multi-user firmware development and debugging host for each of the fourth plurality of SUTs, wherein the first host computer is configured to receive first digital video from the first digital video cameras and the second digital video cameras and to provide the first digital video to the first remote computing device, and the second host computer is configured to receive second digital video from the third digital video cameras and the fourth digital video cameras and to: provide the second digital video to the second remote computing device.

19. The multi-user remote firmware development and debugging system of claim 18, further comprising:

a first network power switch communicatively coupled to the first multi-user firmware development and debugging host;

a second network power switch communicatively coupled to the second multi-user firmware development and debugging host;

a third network power switch communicatively coupled to the third multi-user firmware development and debugging host; and a fourth network power switch communicatively coupled to the fourth multi-user firmware development and debugging host, wherein the first host computer is configured to receive a first power command from the first remote computing device and, in response to receiving the first power command, to transmit the first power command to the first multi-user firmware development and debugging host or the second multi-user firmware development and debugging host to cause the first or second network power switch to power on or off one of the first plurality of SUTs or one of the second plurality of SUTs, and the second host computer is configured to receive a second power command from the second remote computing device and, in response to receiving the second power command, to transmit the second power command to the third multi-user firmware development and debugging host or the third multi-user firmware development and debugging host to cause the third or fourth network power switch to power on or off one of the third plurality of SUTs or one of the fourth plurality of SUTs.

20. The multi-user remote firmware development and debugging system of claim 19, further comprising:

a first network keyboard/video/mouse ("KVM") switch communicatively coupled to the first multi-user firmware development and debugging host, a second network KVM switch communicatively coupled to the second multi-user firmware development and debugging host, a third network KVM switch communicatively coupled to the third multi-user firmware development and debugging host, and a fourth network KVM switch communicatively coupled to the fourth multi-user firmware development and debugging host, and wherein the first host computer is further configured to receive first video output generated by one of the first or second plurality of SUTs from the first multi-user firmware development and debugging host or the second multi-user firmware development and debugging host and to provide the first video output to the first remote computing device, and wherein the second host computer is further configured to receive second video output generated by one of the third or fourth plurality of SUTs from the third multi-user firmware development and debugging host or the fourth multi-user firmware development and debugging host and to provide the second video output to the second remote computing device.

* * * * *